(12) United States Patent
O'Neil Batzold et al.

(10) Patent No.: US 8,206,476 B2
(45) Date of Patent: Jun. 26, 2012

(54) COVER FOR A DIESEL PARTICULATE FILTER

(75) Inventors: James Patrick O'Neil Batzold, Davenport, IA (US); Frank Herman Bosslet, Bexbach (DE); Timothy Franklin Christensen, Moline, IL (US); James Monroe Hershbarger, LeClaire, IA (US); Aaron Matthew Timmerman, Zweibrucken (DE)

(73) Assignee: Deere & Company, Moline, IL (US)

( * ) Notice: Subject to any disclaimer, the term of this patent is extended or adjusted under 35 U.S.C. 154(b) by 90 days.

(21) Appl. No.: 12/752,439

(22) Filed: Apr. 1, 2010

(65) Prior Publication Data

US 2011/0239980 A1   Oct. 6, 2011

(51) Int. Cl.
*B01D 46/00* (2006.01)
(52) U.S. Cl. ............... 55/385.3; 55/418; 55/DIG. 30
(58) Field of Classification Search ............... 55/385.3, 55/498, 502, 511, 521, DIG. 28, DIG. 30; 123/198 E, 184.21; 180/68.3, 219, 229
See application file for complete search history.

(56) References Cited

U.S. PATENT DOCUMENTS

| 3,820,327 | A | 6/1974 | Henault |
| 5,577,570 | A * | 11/1996 | Shiohara et al. ............... 180/219 |
| 6,409,783 | B1 * | 6/2002 | Miyajima et al. ............ 55/385.3 |
| 6,422,197 | B1 * | 7/2002 | Amann et al. ............ 123/198 E |
| 6,695,088 | B2 * | 2/2004 | Schroeder .................. 180/229 |
| 7,264,072 | B2 * | 9/2007 | Yoshikawa et al. .......... 180/68.3 |
| 2005/0051375 | A1 * | 3/2005 | Momosaki ................. 180/219 |

FOREIGN PATENT DOCUMENTS

| DE | 10206066 | 5/2005 |
| DE | 102005008667 | 2/2035 |
| JP | 7279653 | 10/1995 |

OTHER PUBLICATIONS

European Search Report. Dated: Jun. 27, 2011, 3 pgs.

* cited by examiner

*Primary Examiner* — Duane Smith
*Assistant Examiner* — Minh-Chau Pham

(57) ABSTRACT

A cover (120) for a diesel particulate filter (106) includes a hollow chamber (128) with an open bottom (140) sized to receive the body of the diesel particulate filter (106), and a plenum (156) attached to the hollow chamber (128) to receive a supply of air, and to distribute that air to an air vent (152) formed in the top surface (150) of the hollow chamber (128) to direct the air across the top surface of the diesel particulate filter (106).

10 Claims, 3 Drawing Sheets

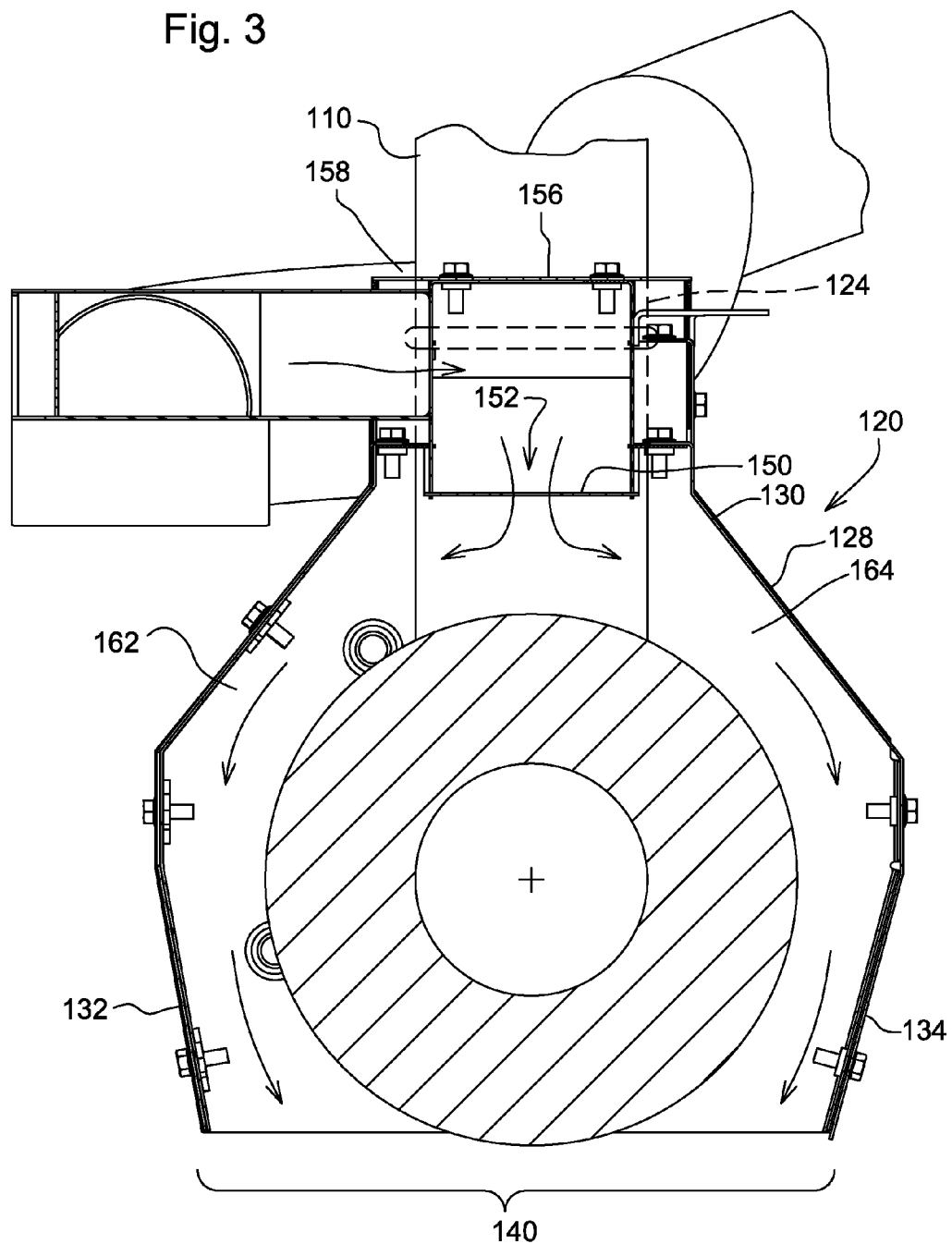

COVER FOR A DIESEL PARTICULATE FILTER

FIELD OF THE INVENTION

This invention relates to internal combustion engines. More particularly, this invention relates to diesel particulate filters for internal combustion engines. Even more particularly, this invention relates to covers for said diesel particulate filters.

BACKGROUND OF THE INVENTION

In recent years, considerable effort has been expended in reducing the combustion inefficiency of internal combustion engines, and reducing particulate matter produced by those engines, as well as gaseous hydrocarbon pollutants.

One of the innovations that has been developed to reduce the pollution caused by internal combustion engines, and particularly by diesel engines, is the diesel particulate filter. A diesel particulate filter collects microscopic particulate matter that is suspended in the exhaust gas issuing from the diesel engine.

Diesel particulate filters must be periodically cleaned. This cleaning is typically done by thermally cycling the diesel particulate filter to incinerate the diesel particulate matter at elevated temperatures, typically on the order of 600° C. Diesel fuel is injected into the exhaust gas leaving the diesel engine to spontaneously combust, thereby elevating the gas temperature and cause it to combust the particulate matter in the diesel particulate filter.

One problem that arises from this process is the periodic elevated temperatures that the diesel particulate filter experiences when it is thermally cycled and cleaned. In normal use it is cool. During the normal mode of operation, combustible material may settle on the now-cool surface of the diesel particulate filter and form a substantial layer that can autocombust if the filter temperature increases to its 600° C. recycling temperature.

What is needed, therefore, is a different arrangement for preventing crop dust from building up on the diesel particulate filter. It is an object of this invention to provide such an arrangement.

SUMMARY OF THE INVENTION

In accordance with a first aspect of the invention, a cover for a diesel particulate filter having a body with top surface, an exhaust gas inlet and an exhaust gas outlet is provided, the cover comprising a hollow chamber having an open bottom into which the diesel particulate filter can be inserted, and an upper surface having at least one air vent configured to receive a flow of air and direct it across the top surface of the diesel particulate filter, a plenum fixed to the chamber to cover the at least one air vent, the plenum having an air inlet and plenum chamber configured to convey air to the air vent.

The diesel particulate filter may be elongate and may have a first longitudinal axis. The cover may be elongate and may have a second longitudinal axis. The open bottom of the cover may be elongate in a direction generally parallel to the two longitudinal axes which may be generally parallel when the diesel particulate filter is received in the hollow chamber. The hollow chamber may have an inner surface, and the diesel particulate filter may have an outer surface. The inner and the outer surfaces may define therebetween a first curved air passageway that extends from the at least one air vent around a first side of the diesel particulate filter to the open bottom, and a second curved passageway that extends in a direction opposite the direction of the first passageway around second side of the diesel particulate filter opposite the first side. The inner and outer surfaces may be cylindrical and generally coaxial. The first and second curved passageways may be right circular cylindrical. The inner surface may be piecewise cylindrical, and maybe be formed of a planar metal sheet. The cylindrical inner surface may be formed by a series of longitudinally extending bends in the planar sheet of metal to form a cylindrical shape. The hollow chamber may comprise a semi-cylindrical upper portion that is dimensioned to form a semicircular passageway with two axially extending elongate edges to which two downwardly extending planar skirts are coupled. The hollow chamber may further comprise first and second end walls that are coupled to and enclose the semi-cylindrical upper portion and the skirts to thereby define the open bottom as a generally rectangular lower opening into which the diesel particulate filter can be inserted. The semi-circular upper portion may define a hole adjacent to the first end wall that is configured to receive and pass the exhaust gas inlet therethrough and further wherein the second end wall may define an elongated slot configured to receive the exhaust gas outlet.

BRIEF DESCRIPTION OF THE DRAWINGS

This patent application describes the invention in conjunction with certain FIGURES that illustrate various embodiments of the invention and its environment. These FIGURES are labeled with reference numbers that correspond to identical reference numbers found in the text herein. These FIGURES are identified as follows.

FIG. 3 is a cross-sectional view of the diesel particulate filter and its cover taken along cutting line 3-3 in FIG. 1 that is perpendicular to the longitudinal axis of the diesel particulate filter and its cover.

DETAILED DESCRIPTION OF THE PREFERRED EMBODIMENTS

Figure 1:
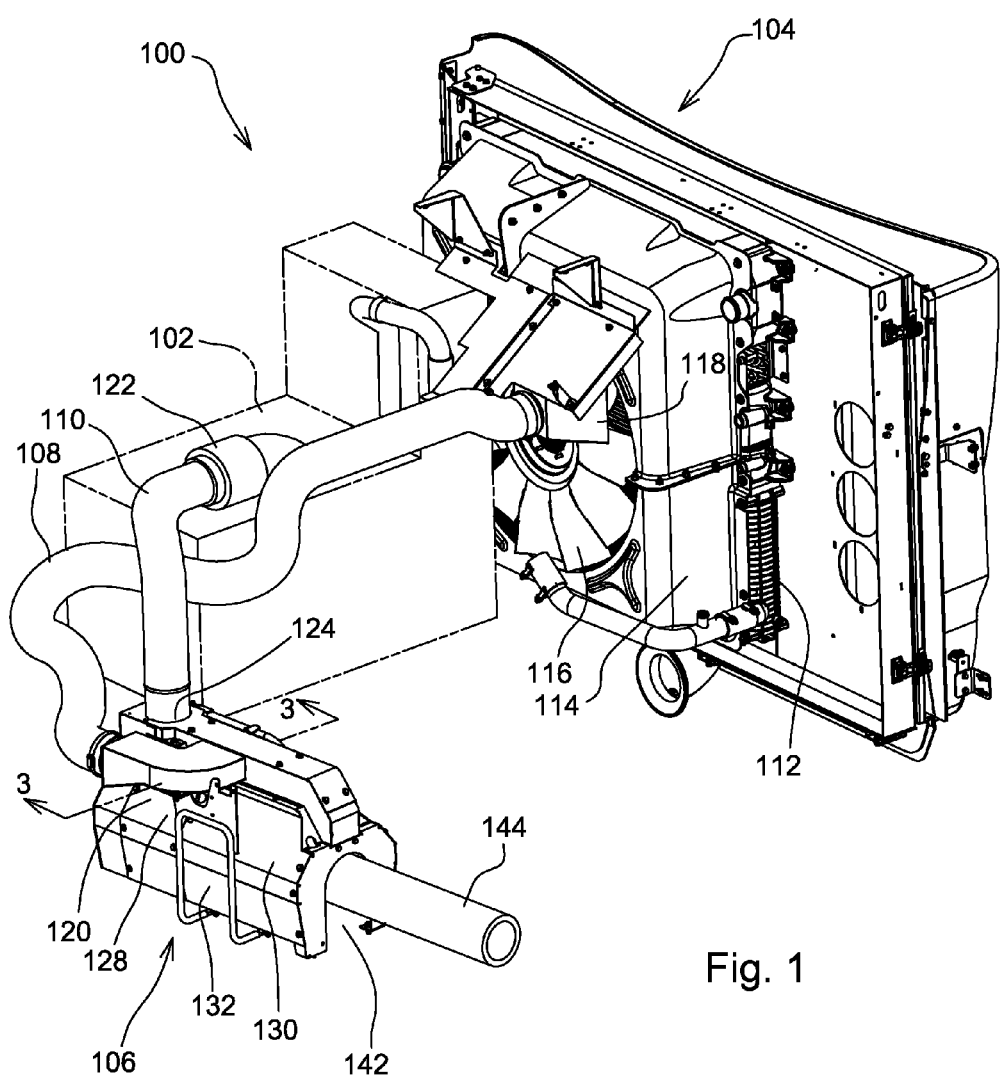
FIG. 1 is a perspective view of the components of an engine compartment of an agricultural vehicle including the cooling system, diesel engine, and diesel particulate filter with cover.

Referring now to FIG. 1, the contents 100 of an engine compartment are shown as they would appear in the engine compartment. In this view, the sheet metal panels that would surround the engine compartment are removed to show the contents 100.

A diesel engine 102, cooling system 104, diesel particulate filter 106, air supply hose 108, and exhaust line 110 are shown.

Cooling system 104 includes a radiator 112 disposed inside a radiator shroud 114. A fan 116 is disposed in large circular shroud 114 to pull cooling air through the radiator, through the fan, and across the engine. And air inlet 118 is disposed immediately behind the fan 116 to receive air pulled through the radiator by the fan 116. Air inlet 118 is coupled to an air supply hose 108 which conveys the air from the air inlet 118 to the cover 120 of the diesel particulate filter 106. Air supply hose 108 is coupled to an air inlet of cover 120 which receives the air and distributes it across the surface of the diesel particulate filter 106.

Engine 102 includes a turbocharger 122 that has an exhaust gas outlet to which is coupled an exhaust line 110. Exhaust line 110 conveys exhaust gas from the diesel engine 102 to an exhaust gas inlet 124 of diesel particulate filter 106.

Figure 2:
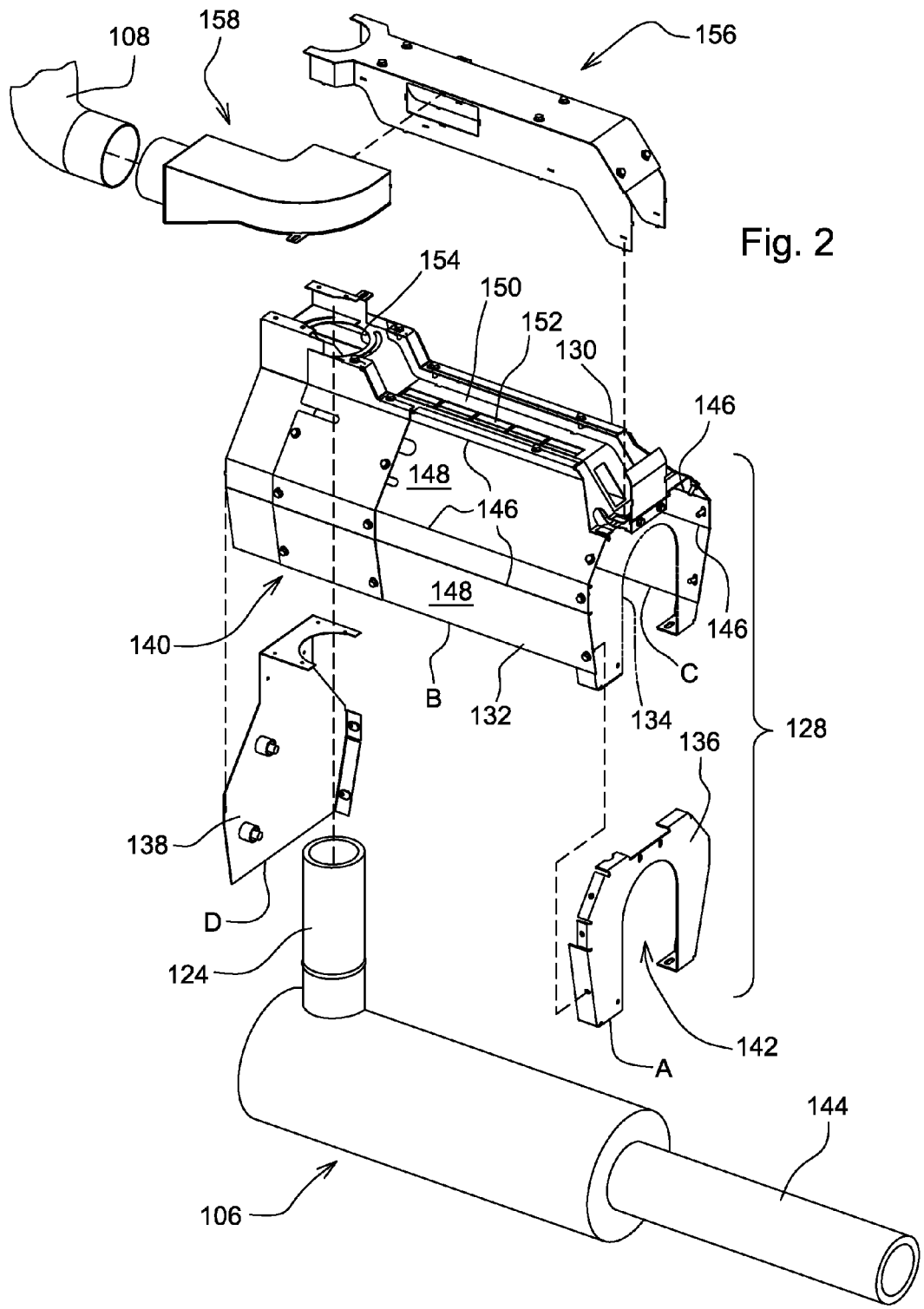
FIG. 2 is an exploded view of the cover of the diesel particulate filter and its cover, showing how they are assembled.

Referring now to FIG. 2, cover 120 defines a hollow chamber 128 having an upper portion 130 that is formed of sheet metal bent into semi-cylindrical shape. Hollow chamber 128 further comprises up downwardly extending lower portion in the form of two skirts 132, 134 that are coupled to the bottom edges of upper portion 130 and extend downwardly therefrom. Together, the general form is that of an inverted "U".

The upper portion 130 and the lower portion are enclosed to form hollow chamber 128 by two end portions 136, 138. End portions 136, 138 form end walls that enclose the upper portion 130 and form the hollow chamber 128. End portions 136, 138 extend downward as far as the bottom of the 2 skirts 132, 134 to form a generally rectangular downwardly facing opening 140 defined by bottom edges A, B, C, D, of hollow chamber 128. An aperture 142 is formed in end portion 136 in the form of a wide slot that extends upward from the bottom edge. Aperture 142 is configured to receive exhaust gas outlet 144 of diesel particulate filter 106.

Upper portion 130 is semi-cylindrical in shape. It is preferably formed, as shown here, by making a series of parallel longitudinal bends in a planar piece of sheet metal to achieve the semi-cylindrical form. Upper portion 130 is therefore preferably piecewise cylindrical being formed by a series of longitudinal bends 146 that join adjacent planar sections 148 of sheet metal.

Top surface 150 of upper portion 130 has an air vent 152 that that is configured to receive a flow of air and to direct it across the top surface of the diesel particulate filter. This air vent 152 is elongated in a direction generally parallel to the longitudinal axis of the upper portion and is preferably in the form of one long slot, multiple slots (as shown in FIG. 2), or multiple holes (circular, elliptical, rectangular, or otherwise). The air vent 152 is sized and oriented to distribute a flow of air evenly across the top of the diesel particulate filter 106 over substantially its entire length. This airflow serves to prevent crop dust from building up on the diesel particulate filter 106, and to provide a cooling flow of air between the walls of hollow chamber 128 and diesel particulate filter 106 during the thermal cycling of the diesel particulate filter 106. This cooling flow of air helps prevent the outer surface of hollow chamber 128 from being elevated to the combustion temperature of combustible crop dust that may have accumulated on the outer surface of the hollow chamber 128.

Top surface 150 of upper portion 130 defines another aperture 154 that is configured to receive and to pass the exhaust gas inlet 124 therethrough. As the body of the diesel particulate filter 106 is inserted into downwardly facing opening 140, exhaust gas inlet 124 passes into and through aperture 154, and the exhaust gas outlet 144 passes into and is received in aperture 142 in end portion 136.

Top surface 150 and air vent 152 are enclosed by a plenum 156 which is mounted to top surface 150 and extends around air vent 152. Plenum 156 is preferably made of sheet metal. Plenum 156 exhausts air through air vent 152, and receives air through air inlet 158. Air inlet 158 is coupled to air supply hose 108 to receive air from the vicinity of the fan. This arrangement permits air generated by the fan to be conducted to the diesel particulate filter and directed downward across the top of the diesel particulate filter over substantially the entire length of the diesel particulate filter. Plenum 156 also defines an aperture 160 that is configured to receive and to pass exhaust gas inlet 124 therethrough when the diesel particulate filter 106 is inserted into cover 120.

Diesel particulate filter 106 is in the form of a cylindrical metal can that forms the body of the diesel particulate filter. A ceramic filter element is sealed inside the can. Exhaust gas outlet 144 is a metal pipe that is sealed to one end of the cylindrical metal can and is in fluid communication with the ceramic filter element sealed inside the cylindrical metal can. Exhaust gas outlet 144 is preferably coaxial with the cylindrical metal can as shown herein. Exhaust gas inlet is a metal pipe that is sealed to the cylindrical side wall of the cylindrical metal can and is in fluid communication with the ceramic filter element through an aperture (not shown) in the side wall of the can that is coupled to the exhaust gas inlet 124.

FIG. 3 illustrates the airflow paths through cover 120 and around diesel particulate filter 106. Air flows into plenum 156 through air inlet 158, where it is distributed longitudinally throughout plenum 156 and then flows downward through air vent 152. Air vent 152 and the dimensions of plenum 156 are selected to ensure a relatively equal air flow rate impinging upon the surface of diesel particulate filter 106 over substantially its entire length.

Air passing through air inlet 158 into hollow chamber 128 impinges up on the top surface of diesel particulate filter 106, is deflected, and proceeds to flow through left and right (in FIG. 3) curved passageways 162, 164 defined by the outer surface of the body of diesel particulate filter 106 and the inner surface of hollow chamber 128. These passageways are preferably of substantially constant thickness as measured in the radial direction, the radial direction being defined as extending from the longitudinal axis of the body of diesel particulate filter 106 or the longitudinal axis of the upper portion of hollow chamber 128. A constant thickness of the passageways helps establish a constant speed of airflow across the surface of the diesel particulate filter, and thereby produces a consistent cleaning effect across the surface of the diesel particulate filter and a constant cooling effect across the inner surface of the semi-cylindrical upper portion of hollow chamber 128. The thickness of the left and right curved passageways 162, 164 increases at approximately the mid-height of the body of diesel particulate filter 106. This increase in thickness provided by the divergence of skirts 132, 134 from the lower surface of diesel particulate filter 106. These skirts 132, 134 extend downward, preferably with a little inward deflection such that they converge towards each other slightly and therefore do not have the cylindrical curvature of the upper portion of hollow chamber 128. This is acceptable since the bottom surface of diesel particulate filter 106 does not collect crop dust due to its inverted, downward facing position, and therefore does not need to be flushed with a constant airflow provided by cover 120. Further, by extending skirts 132, 134 downward, large opening 140 can be provided such that opening 140 has an area sufficient to receive the body of diesel particulate filter 106 simply by inserting diesel particulate filter 106 into the opening.

The invention claimed is:

1. A cover (120) for a diesel particulate filter (106), the diesel particulate filter having a body with a top surface, an exhaust gas inlet (124) and an exhaust gas outlet (144), the cover (120) comprising:

a hollow chamber (128) having an open bottom (140) into which the diesel particulate filter (106) can be inserted, and an upper surface (150) having at least one air vent (152) configured to receive a flow of air and direct it across the top surface of the diesel particulate filter (106);

a plenum (156) fixed to the hollow chamber (128) to cover the at least one air vent (152), the plenum (156) having an air inlet (158) and defining a plenum chamber configured to convey air to the air vent (152).

2. The cover (120) of claim 1 wherein the diesel particulate filter (106) is elongate and has a first longitudinal axis and wherein the cover (120) is elongate and has a second longitudinal axis and further wherein the open bottom (140) of the cover (120) is elongate in a direction generally parallel to the two longitudinal axes when the diesel particulate filter is received in the hollow chamber.

3. The cover (120) of claim 1, wherein the hollow chamber (128) has an inner surface, and the diesel particulate filter (106) has an outer surface.

4. The cover of claim 3, wherein the inner and the outer surfaces define therebetween a first curved air passageway (162) that extends from the at least one air vent (152) around a first side of the diesel particulate filter (106) to the open bottom (140), and a second curved passageway (164) that extends in a direction opposite the direction of the first passageway (162) around second side of the diesel particulate filter opposite the first side.

5. The cover (120) of claim 3, wherein the inner and outer surfaces are cylindrical and generally coaxial.

6. The cover (120) of claim 4, wherein the first and second curved passageways (162, 164) are right circular cylindrical.

7. The cover (120) of claim 5, wherein the inner surface is piecewise cylindrical, being formed of a planar metal sheet, the cylindrical inner surface being formed by a series of longitudinally extending bends (146) in the planar sheet of metal to form a cylindrical shape.

8. The cover (120) of claim 5, wherein the hollow chamber (128) comprises a semi-cylindrical upper portion (130) that is dimensioned to form a semicircular passageway with two axially extending elongate edges to which two downwardly extending planar skirts (132, 134) are coupled.

9. The cover (120) of claim 8, wherein the hollow chamber (128) further comprises first and second end walls (138, 136) that are coupled to and enclose the semi-cylindrical upper portion (130) and the skirts (132, 134) to define the open bottom (140) as a generally rectangular lower opening into which the diesel particulate filter (106) can be inserted.

10. The cover (120) of claim 9 wherein the semi-cylindrical upper portion (130) defines an aperture (154) adjacent to the first end wall (138) that is configured to receive and pass the exhaust gas inlet therethrough and further wherein the second end wall (136) defines an elongated slot (142) configured to receive the exhaust gas outlet (144).

* * * * *